(12) United States Patent
Xie et al.

(10) Patent No.: US 12,461,735 B2
(45) Date of Patent: Nov. 4, 2025

(54) DYNAMICALLY UPDATING FIRMWARE PROFILE CONFIGURATIONS ON COMPUTING DEVICES

(71) Applicant: Microsoft Technology Licensing, LLC, Redmond, WA (US)

(72) Inventors: Daini Xie, Redmond, WA (US); Wen-Ho Chen, Taipei (TW); Yuwen Chou, Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 17/971,405

(22) Filed: Oct. 21, 2022

(65) Prior Publication Data

US 2024/0134625 A1 Apr. 25, 2024
US 2024/0231793 A9 Jul. 11, 2024

(51) Int. Cl.
*G06F 8/65* (2018.01)
*G06F 9/445* (2018.01)

(52) U.S. Cl.
CPC .............. *G06F 8/65* (2013.01); *G06F 9/4451* (2013.01)

(58) Field of Classification Search
CPC ........... G06F 21/64; G06F 8/65; G06F 9/4451
See application file for complete search history.

(56) References Cited

U.S. PATENT DOCUMENTS

| | | | |
|---|---|---|---|
| 5,239,635 A * | 8/1993 | Stewart | G06F 12/1027 711/206 |
| 11,385,903 B2 | 7/2022 | Xie et al. | |
| 11,392,391 B2 | 7/2022 | Sumanth | |
| 2004/0230963 A1 * | 11/2004 | Rothman | G06F 8/65 717/168 |
| 2014/0181042 A1 * | 6/2014 | Toyama | G06F 11/1451 707/652 |
| 2017/0242686 A1 * | 8/2017 | Vidyadhara | G06F 8/656 |
| 2019/0243634 A1 * | 8/2019 | Lewis | G06F 8/654 |

(Continued)

FOREIGN PATENT DOCUMENTS

EP 3608821 A1 * 2/2020 ........... G06F 21/572

OTHER PUBLICATIONS

International Search Report and Written Opinion received for PCT Application No. PCT/US23/031934, mailed on Dec. 13, 2023, 13 pages.

(Continued)

*Primary Examiner* — Ziaul A Chowdhury
(74) *Attorney, Agent, or Firm* — Ray Quinney & Nebeker P.C.; James S. Bullough

(57) ABSTRACT

The present disclosure relates to utilizing a firmware configuration system to efficiently update a firmware profile configuration of computing devices (e.g., host devices in a datacenter). For example, the firmware configuration system facilitates updating the firmware profile configuration, such as for a Unified Extensible Firmware Interface (UEFI) profile and/or a Basic Input/Output System (BIOS), without needing to develop, deploy, and install a new BIOS. More specifically, the firmware configuration system updates (e.g., via a baseband management controller) firmware profile configurations by modifying a profile configuration table in flash memory (i.e., on an SPI flash-based chip) of a BIOS with a firmware profile configuration update patch and without affecting other parts of the BIOS.

20 Claims, 9 Drawing Sheets

(56) References Cited

U.S. PATENT DOCUMENTS

2019/0340365 A1\* 11/2019 Nijhawan ............... G06F 21/44
2021/0326431 A1\* 10/2021 Zhang .................. G06F 21/575
2022/0129258 A1    4/2022 Ladkani et al.
2022/0156377 A1    5/2022 Xie et al.
2023/0205709 A1\* 6/2023 Parker ................. G06F 12/1009
                                                        711/163

OTHER PUBLICATIONS

International Preliminary Report On Patentability received for PCT Application No. PCT/US23/031934, mailed on May 1, 2025, 08 pages.

\* cited by examiner

DYNAMICALLY UPDATING FIRMWARE PROFILE CONFIGURATIONS ON COMPUTING DEVICES

BACKGROUND

Recent years have seen significant advancements in both hardware and software on host computing devices. One example where this is evident is in the area of computer datacenters, which typically use a large number of host computing devices (e.g., servers) to provide services to clients. Host computing devices may also be used in other places to provide a variety of functions.

Despite advances in host computing devices, there are still many challenges associated with maintaining, operating, and updating host computing devices. In particular, current host computing devices face several technical shortcomings that result in inefficient and inflexible computing operations, particularly in the area of performing firmware profile configuration updates. Additionally, as will be apparent from the discussion below, these problems compound and become more complex as the number of computing devices needing firmware updates increases (e.g., such as in a datacenter scenario).

By way of context, firmware is a specific class of computer software that provides low-level control for the hardware of a computing device (e.g., a host computing device). For example, firmware is held in non-volatile memory devices such as a serial peripheral interface (SPI) based flash chip (called SPI flash or flash memory). Additionally, firmware is often used to perform hardware initialization during the booting process of a computing device, and also to provide runtime services for operating systems and programs. Examples of computing device firmware include the Basic Input/Output System (BIOS), which provides runtime services for operating systems when a client device is booting up. Unified Extensible Firmware Interface (UEFI) is a specification that connects the hardware of a client device to its operating system (OS). UEFI provides several technical advantages over a traditional BIOS system (called a legacy BIOS). In some instances, firmware is directed toward runtime code and operations. In other instances, portions of firmware are hard-coded, such as with binary firmware configuration settings.

As mentioned above, existing computer systems face several technical shortcomings that result in inefficient and inflexible computing operations with respect to performing firmware profile configuration updates on host computing devices. For example, when updating a UEFI profile configuration, unlike runtime patches, existing computer systems require the entire BIOS firmware to be replaced or flashed with a new BIOS firmware version. Because a replacement BIOS is needed, these updates are time, resource, and labor intensive. To illustrate, the process of adding a profile configuration or modifying an existing profile configuration for existing computer systems requires updating, testing, validating, releasing, and fully flashing a BIOS, which can take several days to weeks.

Moreover, existing computer systems use firmware profile configurations that are hardcoded in tables stored in multiple locations across a BIOS (which can be difficult to find in the BIOS code). As a result, if an existing computer system tried to modify one of the profile configurations in the code of the BIOS, it would break security protections (e.g., hashes would no longer be valid) and not function. Accordingly, if a profile configuration needs to change, existing computer systems must take a computing device (e.g., a host computing device) offline while it undergoes the process of re-installing and re-flashing the entire BIOS with a new BIOS.

To compound the above issue of re-installing a BIOS to update firmware profile configurations, some configuration changes occur frequently. For example, when an entity desires a particular feature to be enabled, a new profile configuration may be needed. When new hardware components are introduced to computing devices, profile configurations need to be updated to accommodate them. If a computing device is being shared between multiple entities, as is common in a datacenter setting, profile configuration changes are often needed when the computing device changes between entities. These and other situations necessitate a firmware profile configuration update, which currently requires a full BIOS flash.

These and other problems result in significant inefficiencies, inaccuracies, and inflexibilities of existing systems regarding updating non-runtime, firmware profile configurations on computing devices such as host computing devices.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
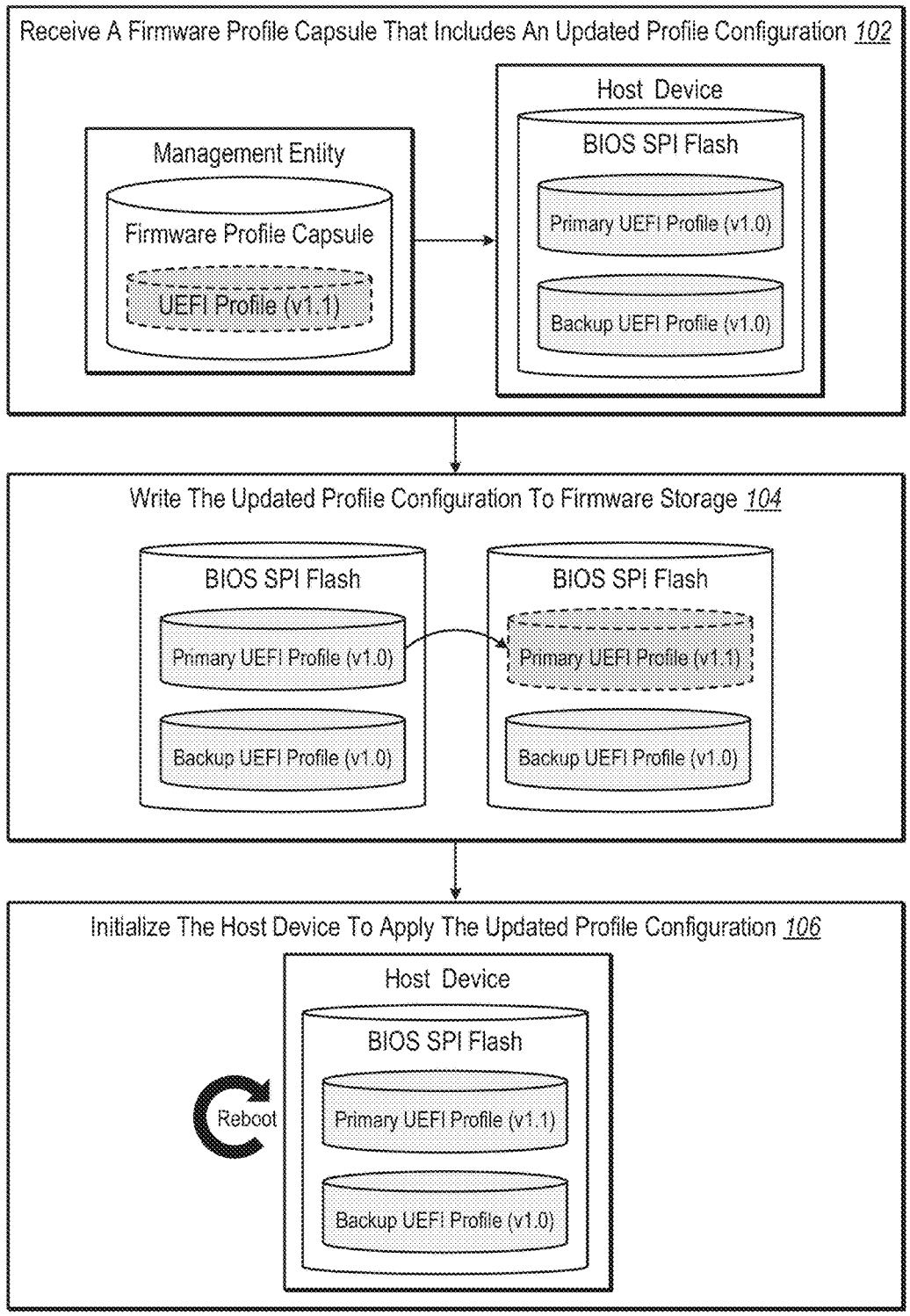
FIG. 1 illustrates an example overview for updating a firmware profile configuration of a computing device in accordance with one or more implementations.

Implementations of the present disclosure provide benefits and/or solve one or more of the foregoing or other problems in the art with systems, methods, and/or devices that utilize a firmware configuration system to efficiently update a firmware profile configuration of one or more computing devices (e.g., host computing devices). For example, the firmware configuration system facilitates flexibly modifying a select firmware profile configuration portion of a BIOS on a computing device without needing to develop and deploy an entire new BIOS.

To elaborate, a BIOS includes multiple firmware profile configurations for computing devices (e.g., servers) to accommodate different client needs. These profile configurations are commonly hardcoded as part of the BIOS. As noted above, to add a new profile configuration or modify an existing one, existing computer systems need to recode, recompile, and redeploy a new BIOS to the computing devices, which is a time-consuming and impactful process. Accordingly, the firmware configuration system significantly improves this process by updating BIOS firmware profile configurations without needing to generate and release a new BIOS. Rather, the firmware configuration system facilitates updating firmware profile configurations via modifying the BIOS to accept firmware profile configuration update patches that update profile configuration tables without affecting other parts of the BIOS.

To illustrate, in one or more implementations, the firmware configuration system on a computing device (e.g., a server in a datacenter) receives a firmware profile configuration update patch (e.g., a set of instructions that cause a portion of a firmware of a computing device associated with profile configurations to be changed) via a firmware profile capsule. In particular, the firmware profile capsule includes a profile configuration table that has one or more new profile configurations (e.g., a profile configuration that was not included in a previous profile configuration table). Further, the firmware configuration system writes the profile configuration table to a predetermined location on flash memory (e.g., a serial peripheral interface (SPI) flash-based chip) that updates a previous profile configuration table. In addition, the firmware configuration system initializes the computing device to apply the new profile configuration. For instance, the firmware configuration system quickly reboots the device to activate the updated profile configuration table.

As described in this document, the processing engine system provides several technical benefits in terms of computing efficiency, accuracy, and flexibility compared to existing computing systems. Indeed, the processing engine system provides several practical applications that deliver benefits and/or solve problems associated with updating firmware profile configurations of a BIOS on a computing device. Additionally, while the methods and approaches in this document are described in terms or BIOS or UEFI, the methods and approaches are applicable to both UEFI BIOS and Legacy BIOS architectures.

To elaborate, in various implementations, the processing engine system improves efficiency and flexibility by dynamically updating firmware (e.g., UEFI and/or BIOS hereafter called "UEFI BIOS") profile configurations without flashing the BIOS and/or modifying the binary code of the BIOS of a computing device. Instead, the firmware configuration system facilitates receiving and injecting an updated profile configuration table with new and/or modified profile configurations to the computing device. In some instances, the firmware configuration system updates the firmware of the computing device by surgically injecting the updated profile configuration table into flash memory (e.g., the SPI flash of the BIOS) of the computing device.

As another example, the firmware configuration system dynamically updates firmware profile configurations without interrupting operating system (OS) operations of the computing device (e.g., a host device). For example, in various implementations, the firmware configuration system utilizes an out-of-band communication path to receive updated profile configuration tables. For instance, in various implementations, the firmware configuration system utilizes an out-of-band (OOB) interface of an auxiliary service controller (e.g., a baseband management controller) to receive, process, and inject new profile configuration settings without interrupting the workload of the computing device.

As an additional example, in one or more implementations, the firmware configuration system stores the profile configuration table in the data section of non-volatile memory. As noted above, existing computer systems embed and scatter the profile configuration table throughout the BIOS code (e.g., within different drivers in the SPI flash), which makes finding the location of the profile configuration table difficult. Further, existing computer systems often prevent extending a profile configuration table profile table (e.g., adding new profiles) as modifying the binary code of a BIOS to add a profile would break security measures (e.g., makes hashes invalid). In contrast, the firmware configuration system extracts the profile configuration table and stores it as a more unified table in the data section of the BIOS code (e.g., as a carved-out portion of the SPI flash). Indeed, the firmware configuration system simplifies updating the firmware profile configuration of a computing device via adding an added layer of abstraction by generating and storing a unified profile configuration table in the SPI flash.

To further illustrate, when a new BIOS is initially generated for computing devices, it includes a limited number of profile configurations. As these computing devices are rolled out to entities and/or new generations of computing devices are released, new profile configurations are needed. In these implementations, the firmware configuration system easily adds new profile configurations to the BIOS without needing to rebuild and reinstall the BIOS for each of the many incremental updates.

As another benefit, the firmware configuration system allows for a computing device to be easily transferred between entities. For example, if a first entity loans some of its servers to a second entity (or another group within the entity) that has different device configuration needs, rather than creating a new BIOS with the new profile configurations and flashing each of the servers, the firmware configuration system need only to inject the additional profile configuration (or modify an existing profile configuration) into the profile configuration table of the servers to add a new profile configuration without needing to release and install a full new BIOS.

Notably, the firmware configuration system corresponds to firmware configuration patches, such as UEFI configuration patches, that modify profile configurations, which include configuration settings of the BIOS. Traditionally, firmware configuration updates require modifying the binary code of a BIOS. As described herein, the firmware configuration system does not correspond to runtime patches that update the runtime area of the firmware code (e.g., a UEFI runtime patch (URP)). These types of runtime patches can occur without needing to rebuild the BIOS. Accordingly, the firmware configuration system corresponds to firmware configuration patches and not firmware update patches.

As illustrated in the foregoing discussion, the present disclosure utilizes a variety of terms to describe the features and advantages of one or more implementations described herein. For instance, as used herein, operations of the processing engine system utilize one or more processing engines. Accordingly, the term "firmware" refers to a specific class of computer software that provides low-level control for the hardware of a computing device. For example, the firmware on a computing device manages interactions between and among the hardware components of the computing device.

In various implementations, firmware is held in non-volatile memory devices such as read-only memory (ROM), erasable programmable ROM (EPROM), electrically erasable programmable ROM (EEPROM), or flash memory (i.e., SPI flash-based memory). As used herein, the term "storage" refers to non-volatile memory and the term "firmware storage" refers to firmware stored within non-volatile memory. According to some implementations, firmware is used to perform hardware initialization during the booting process of a computing device, and also to provide runtime services for operating systems and programs.

As mentioned above, Unified Extensible Firmware Interface (UEFI) is a specification for BIOS architecture that provides several technical advantages over traditional BIOS systems (e.g., the Legacy BIOS architecture). For example, UEFI allows for larger disks, launching extensible firmware interface (EFI) executables, graphics and mouse support, and added security measures. In some instances, firmware is directed toward runtime code and operations. In other instances, portions of firmware are hard-coded, such as with binary firmware configuration settings. As used herein, UEFI BIOS refers to the common processes of UEFI BIOS.

As noted above, in various implementations, firmware is stored on a serial peripheral interface-based flash chip (called SPI flash). As used herein, the term "flash memory" refers to SPI flash. As also used herein, the terms "SPI flash" and "BIOS SPI flash" refer to firmware stored in an SPI-based flash memory chip.

As used herein, the terms "firmware profile configuration update patch" and "firmware configuration update patch" (or simply "firmware patch") refer to a set of data or instructions that, when executed, cause a portion of the firmware of a computing device associated with profile configurations to be changed for updating, adding, modifying, or improving the configuration settings of the firmware on a computing device. Often, a firmware configuration update patch includes a profile configuration table, which includes profile configurations (e.g., new, modified, and/or existing profile configurations).

As used herein, the terms "firmware profile capsule" or "firmware profile configuration capsule" refer to a data structure for sending a firmware profile configuration update patch to a computing device that has a profile configuration table. In various implementations, a firmware profile capsule is a firmware volume that includes a firmware profile header, one or more profile configurations (e.g., a profile configuration table), and security verification information. Additional information regarding firmware profile capsules is provided below in connection with FIG. 2.

As used herein, the term "profile configuration" refers to the configuration of firmware settings on a computing device for a given profile. For example, in various implementations, a profile configuration corresponds to a UEFI BIOS configuration that identifies various chip-set settings (e.g., hyperthreading and other special features), hardware component configurations, and/or external device configurations with respect to a given profile. Indeed, a profile configuration includes configuration settings indicating activation states of hardware elements of the computing device. Different profiles associated with different profile configurations for the same computing device may indicate different configuration settings. Additionally, multiple profile configurations may combine to form a profile configuration table, which is stored in the SPI flash of a computing device.

Additionally, the term "new profile configuration" refers to a profile configuration in a profile configuration table (e.g., a new or updated profile configuration table) that was not included in a previous profile configuration table. Similarly, the term "modified profile configuration" refers to a profile configuration in a profile configuration table that was included in a previous profile configuration table as a different version (e.g., having at least one change).

As used herein, the term "entity" refers to a single computing device or multiple computing devices that function together (e.g., as in a cloud computing system or another kind of distributed computing system). According to some implementations, a management entity manages one or more computing devices. For example, a management entity monitors, initiates, provides, and/or pushes firmware updates to computing devices in a datacenter. In various implementations, the management entity communicates with the computing devices via one or more computer networks.

Additional details will now be provided regarding the components and elements of the firmware configuration system. For example, FIG. 1 illustrates an example overview for updating the firmware profile configuration of a computing device in accordance with one or more implementations. In particular, FIG. 1 includes a series of acts 100 performed by the firmware configuration system. In some implementations, the firmware configuration system utilizes a baseboard management controller (BMC) to perform one or more of the series of acts 100.

To illustrate, the series of acts 100 includes an act 102 of receiving a firmware profile capsule that includes an updated profile configuration. For example, a host computing device (i.e., a host device) includes BIOS firmware that has profile configurations for the device stored in flash memory (i.e., BIOS SPI flash). In particular, the host device stores the profile configurations with a profile configuration table as part of a configuration profile (e.g., shown as the UEFI profiles). Then, when a new or modified profile configuration needs to be added to the host device, the firmware configuration system facilitates receiving a firmware profile capsule that includes the new or modified profile configuration.

As shown, the management entity provides the firmware profile capsule to the host device (i.e., a computing device). According to some implementations, the firmware profile capsule includes a profile configuration table that includes the new or modified profile configuration. Additional detail regarding firmware profile capsules is provided below in connection with FIG. 2. Additionally, in various implementations, the firmware configuration system (e.g., via the BMC) validates the contents of the firmware profile capsule, such as validating accurate transmission and encryption, as provided below in connection with FIG. 3A.

As illustrated, the series of acts 100 includes an act 104 of writing the updated profile configuration to the firmware storage. For example, according to some implementations, the firmware configuration system writes an updated profile configuration table from the firmware profile capsules to flash memory (i.e., BIOS SPI flash). In various implementations, the firmware configuration system adds and/or modifies the existing profile configuration table. In some implementations, the firmware configuration system replaces the previous profile configuration table with the updated profile configuration table received in the firmware profile capsule. Additional information about writing profile configurations to the flash memory of the host device is provided below in connection with FIGS. 3A and 3B.

As also illustrated, the series of acts 100 includes an act 106 of initializing the host device to apply the updated profile configuration. Upon writing the new or updated profile configuration, in various implementations, the firmware configuration system initializes the profile configuration update. For example, the firmware configuration system reboots or restarts the computing device to effectuate the firmware profile configuration update. Rebooting is a much quicker and simpler process than fully installing a new BIOS, as is required by existing computer systems. Additional detail regarding initiating the firmware profile configuration update is provided below in connection with FIG. 3A.

Figure 2:
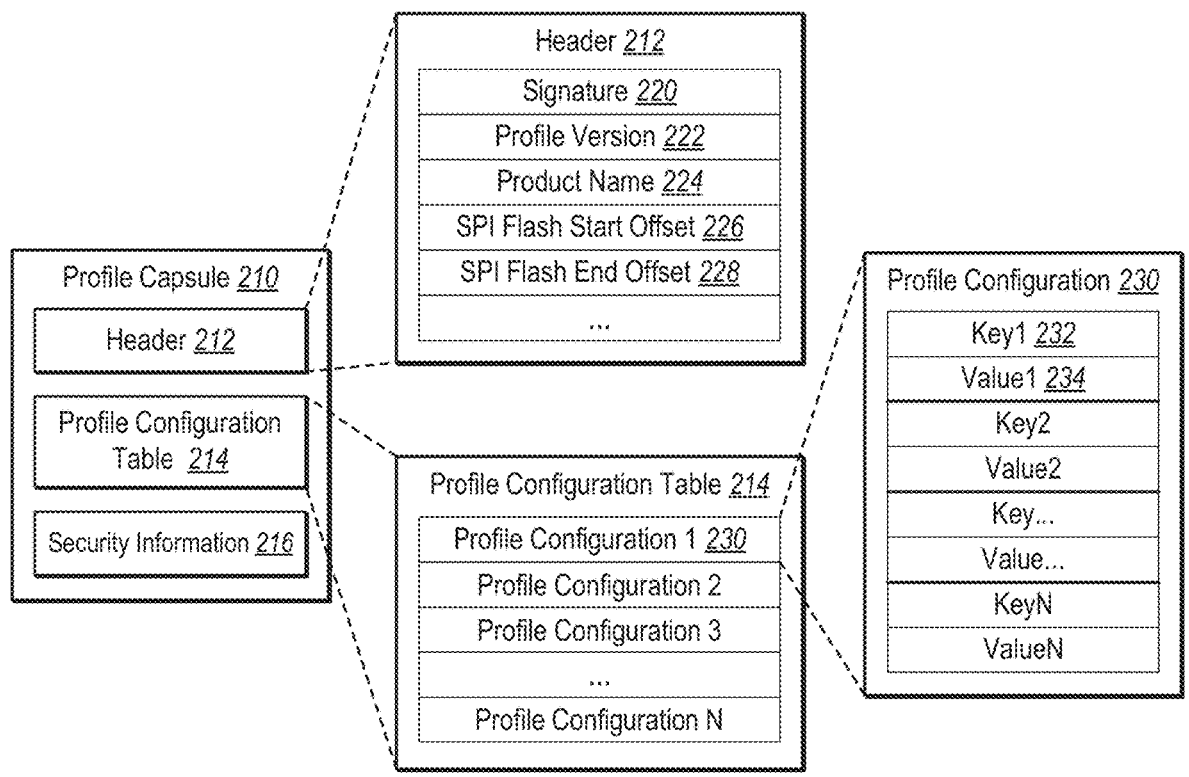
FIG. 2 illustrates a diagram of a profile capsule including an updated profile configuration table in accordance with one or more implementations.

As noted above, FIG. 2 provides additional detail regarding firmware profile capsules. In particular, FIG. 2 illustrates a diagram of a profile capsule (e.g., a UEFI profile capsule) that includes an updated profile configuration table in accordance with one or more implementations. As shown, FIG. 2 includes a profile capsule 210 (i.e., a firmware profile capsule) that includes a header 212 (i.e., a firmware profile header), a profile configuration table 214 (i.e., a firmware profile configuration table), and security information 216 (i.e., firmware profile security verification information). According to many implementations, the profile capsule 210 corresponds to a profile configuration update (e.g., the profile capsule 210 includes a firmware profile configuration update patch that includes instructions that cause a portion of a firmware of a computing device associated with profile configurations to be changed).

To illustrate, portions of the profile capsule 210 are enlarged in FIG. 2. For example, the header 212 is enlarged to show an example header. As shown, the header 212 includes encryption signature, firmware profile information, and SPI flash offset information. In particular, the header 212 includes a signature 220, a profile version 222, a product name 224, an SPI flash start offset 226, an SPI flash end offset 228, and other header information. In various implementations, the header 212 includes additional or different header information. In some implementations, the header information is included elsewhere in the profile capsule 210. For example, the signature 220 is included as part of the security information 216.

In various implementations, the signature 220 includes encryption information. For instance, the profile capsule 210 is a signed profile capsule that has been signed with a private key by the management entity. As provided below, in various implementations, the firmware configuration system utilizes the signature 220 to authenticate the profile capsule 210 as being from an authorized source, as injecting information into the firmware from an untrusted source can have damaging consequences.

In one or more implementations, the header 212 includes firmware profile information, such as the profile version 222 and the product name 224. For example, the profile information includes a version stamp for version control, profile configuration metadata, code comments, profile configuration identifiers for profile configurations in the profile configuration table 214, and/or other profile information.

In some implementations, the header 212 includes memory offset information such as the SPI flash start offset 226 and/or the SPI flash end offset 228. As noted above, in various implementations, the firmware configuration system carves out a separate area of the flash memory in the data section of non-volatile memory (e.g., SPI flash) to store a profile configuration table of profile configurations. For instance, the firmware configuration system removes the requirement of needing to call the old profile table at the old locations scattered across the BIOS code and instead points to calling the new profile table at the new location within the flash memory. Accordingly, in various implementations, the memory offset information in the header 212 indicates where the profile configurations in the profile capsule 210 are to be written on the flash memory. In this manner, the firmware configuration system does not need to spend computing resources to locate the locations of profile configurations stored in the BIOS, as was the case with existing computer systems. In certain implementations, the firmware configuration system determines where to write the contents of the profile capsule 210 to flash memory.

As mentioned above, the profile capsule 210 includes the profile configuration table 214. In various implementations, the profile configuration table includes a profile configuration 230 (or multiple profile configurations). To illustrate, an expanded version of the profile configuration table 214 is shown in FIG. 2. As shown, the profile configuration table 214 includes profile configurations. In many implementations, a profile configuration 230 includes a set of profile configuration settings (e.g., chip-set settings, hardware disk configurations, external device configurations) that accommodate the needs of different computing device clients. In various implementations, a profile configuration 230 is a newly added configuration. In some implementations, a profile configuration 230 is a modified or updated version of a previously created profile configuration.

FIG. 2 also shows an expanded version of the profile configuration 230. As shown, the profile configuration 230 includes keys 232 and values 234 corresponding to a profile configuration setting. For example, the keys 232 and values 234 in a profile configuration 230 indicate the preferences of a computing device client. Indeed, in various implementations, a profile configuration 230 includes supported profile settings where each profile setting is constructed using a key/value table.

Additionally, the profile capsule 210 includes the security information 216 (security verification information). Among various implementations, the security information 216 includes error-correction information, such as cyclic redundancy check (CRC) and/or other error-detecting codes, to ensure proper transmission of the profile capsule 210. In some implementations, the security information 216 includes separate error-correction information for the header 212 and the profile configuration table 214.

Figure 3A:
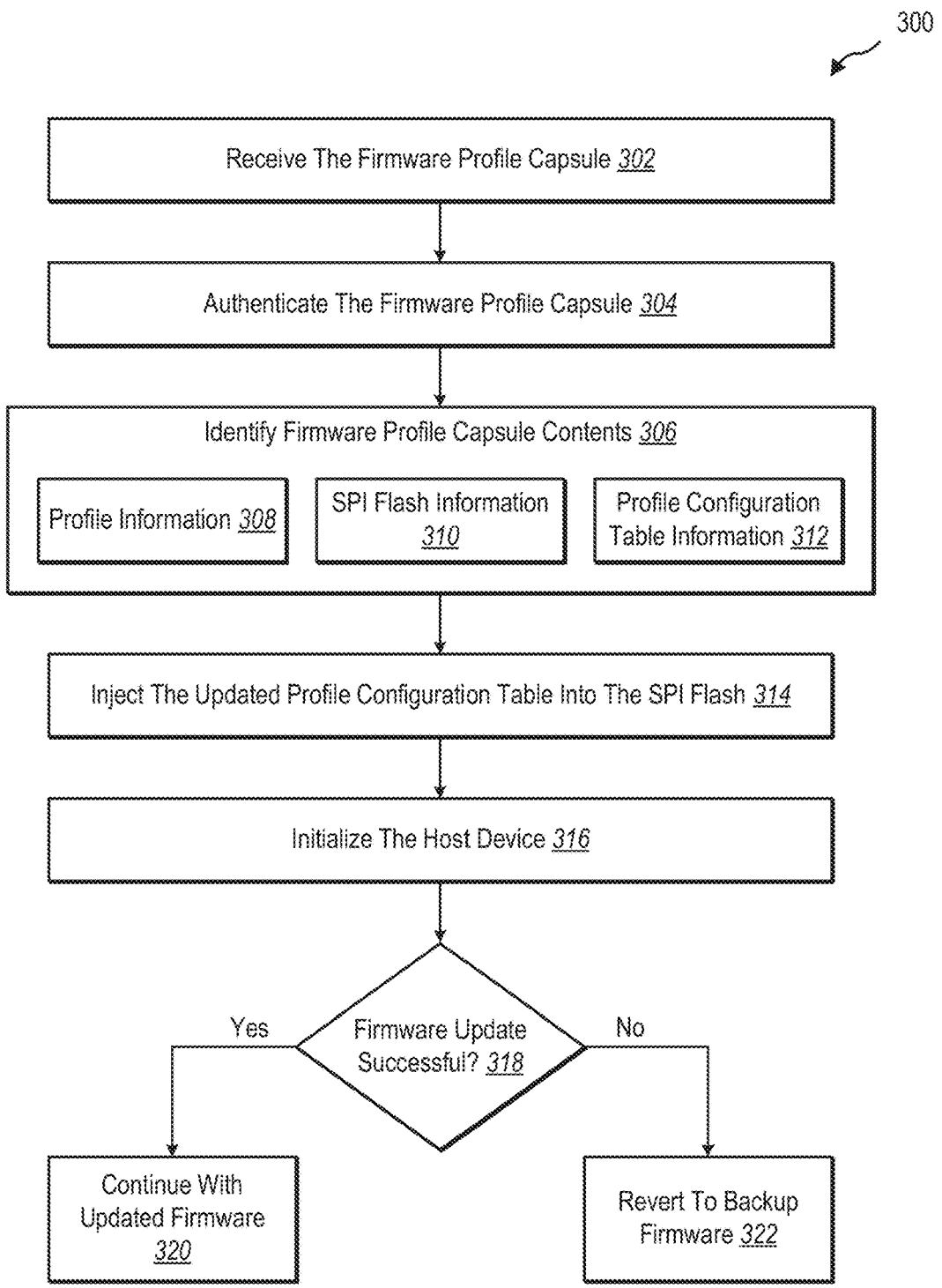
FIG. 3A-3B illustrate a flow diagram of updating a firmware profile configuration in accordance with one or more implementations.
Figure 3B:
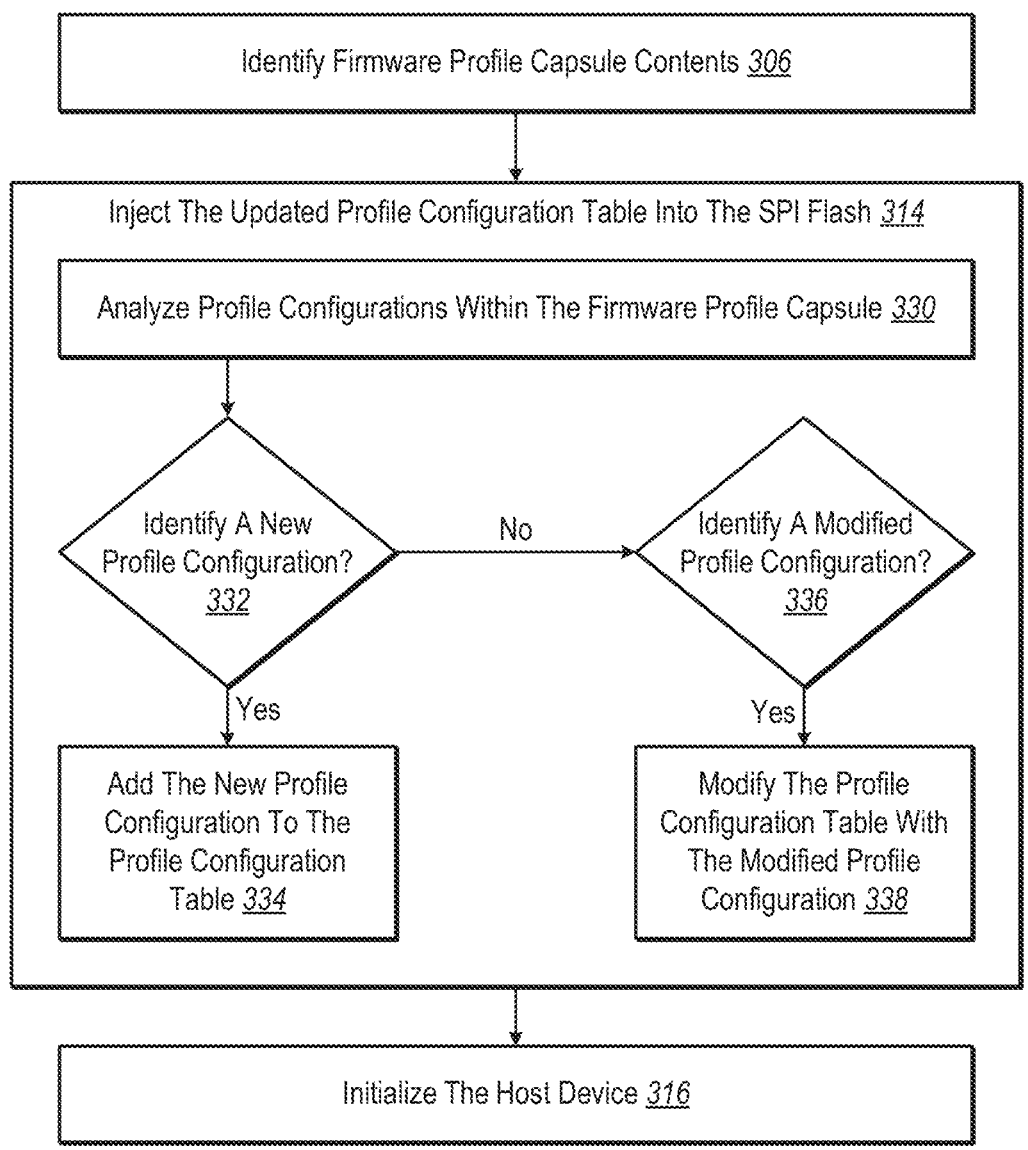

As mentioned above, FIGS. 3A-3B provide additional detail regarding updating a firmware profile configuration on a computing device. In particular, FIG. 3A-3B illustrate flow diagrams with detailed actions for updating a firmware profile configuration in accordance with one or more implementations. In particular, FIGS. 3A-3B include a series of acts 300 performed by the firmware configuration system. In some implementations, the firmware configuration system utilizes a baseboard management controller (BMC) to perform one or more of the series of acts 300.

As shown, the series of acts 300 includes an act 302 of receiving a firmware profile capsule at a host device (i.e., a computing device). For example, the firmware configuration system receives a UEFI profile capsule from a management entity that includes updates for UEFI profile configuration settings. In some instances, the profile capsule includes a minor firmware profile configuration update (e.g., adding or modifying a single profile configuration). In other instances, the profile capsule includes a large firmware profile configuration update.

According to some implementations, the firmware configuration system receives the profile capsule via an out-of-band (OOB) communication path. As used herein, the term "out-of-band" refers to having a channel or path of communication separate from a primary communication channel or path that communicates with the operating system of a computing device (e.g., a host device or server device).

In one or more implementations, receiving the profile capsule OOB enables the firmware configuration system to update the firmware without any interruption to the operating system, workflows, or processes on the host device. For example, in certain implementations, the firmware configuration system utilizes a BMC, which operates separately from the CPU of the operating system on the host device, to receive and inject the profile configuration update. In alternative implementations, the firmware configuration system utilizes an in-band communication path to receive the profile capsule.

In various implementations, the profile capsule is securely signed. For example, a management entity or another device utilizes a firmware private key to sign the profile capsule. Accordingly, as shown, the series of acts 300 includes an act 304 of authenticating the firmware profile capsule. For example, the firmware configuration system authenticates the UEFI profile capsule with a firmware public key to ensure that it was sent by the management entity and not another party (e.g., an unauthorized device). In this manner, because firmware updates may significantly affect the functionality of a computing device, the firmware configuration system ensures that updates to the BIOS configuration are properly authorized.

As shown, the series of acts 300 includes an act 306 of identifying firmware profile capsule contents. As provided above in connection with FIG. 2, the profile capsule includes various information. To illustrate, FIG. 3A shows that the profile capsule includes profile information 308, SPI flash information 310, and profile configuration table information 312. As described above, the profile capsule can include additional or different information. In any case, the firmware configuration system identifies and/or verifies (e.g., CRC check) data in the profile capsule.

Additionally, the series of acts 300 includes an act 314 of injecting the updated profile configuration table into the SPI flash. For example, the firmware configuration system (e.g., via a BMC) injects profile configurations from the profile configuration table information 312 into the flash memory based in the SPI flash information 310. Additional information with respect to injecting updated profile configurations is provided in FIG. 3B below.

In some implementations, the firmware configuration system maintains backup versions of profile configurations (e.g., a profile configuration table). For instance, when the firmware configuration system writes the updated profile configuration table to flash memory, it writes it to a primary flash memory region (e.g., a primary UEFI profile region) while also maintaining one or more previous versions of profile configuration tables in a backup flash memory region (e.g., a secondary UEFI profile region). In this manner, if the primary region is corrupted, the firmware configuration system may fall back to a previous version of the profile configuration table.

The series of acts 300 also includes an act 316 of initializing the host device. In various implementations, the firmware configuration system initializes the host device by rebooting or restarting it when workflows on the host device are finished. For example, when the host device is not running any workloads on the system and/or is performing other updates, the firmware configuration system reboots to apply the profile configuration updates. Notably, in these implementations, the firmware configuration system only needs to quickly reboot or reinitialize the host device to apply the update rather than flash the entire BIOS, which keeps the computing device offline for a significantly longer time.

As shown, the series of acts 300 includes an act 318 of verifying that the firmware updated successfully. For example, the firmware configuration system confirms that the updated profile configuration table runs. In some implementations, the firmware configuration system determines that the firmware update satisfies a system security design to ensure that the update patch installed correctly. Further, in some instances, the firmware configuration system validates that the profile configuration update has not been tampered with during the initialization (e.g., reboot) process. In example implementations, the security design of the host device corresponds to a root of trust (RoT) security design.

Upon determining that the firmware profile configurations updated successfully, the firmware configuration system continues on the host device with the updated firmware profile, as shown in the act 320. Otherwise, if the firmware configuration system determines that the profile configuration update did not initialize successfully and/or has been changed, the firmware configuration system reverts to a backup firmware profile, as shown in the act 322. For instance, the firmware configuration system utilizes a backup version of the profile configuration table, as described above.

As mentioned above, FIG. 3B provides additional description regarding the act 314 of injecting the updated profile configuration table into the SPI flash. As shown, the act 314 includes various sub-acts. Additionally, for context, FIG. 3B also includes the act 306 and the act 316 from FIG. 3A, which go before and after the act 314.

As shown, the act 314 includes a sub-act 330 of analyzing profile configurations within the firmware profile capsule. For example, in various implementations, the firmware configuration system analyzes the profile configurations within the updated profile configuration table from the firmware profile capsule to determine the types of profile configurations that are included. For instance, the updated profile configuration table includes existing profile configurations, modified versions of existing profile configurations, and/or new profile configurations (e.g., a profile configuration in a profile configuration table such as adding additional UEFI configuration profiles). In some instances, the updated profile configuration table includes only modifications (e.g., deltas) to those currently stored within the flash memory of the host device. In other instances, the updated profile configuration table includes a replacement of the profile configuration table currently stored on the host device.

To further illustrate, the act 314 includes a sub-act 332 of identifying a new profile configuration. For example, when a profile configuration that includes a new set of profile configuration settings is desired and/or needed, the firmware configuration system generates or otherwise receives a new profile configuration. For instance, when new clients, new entities, or new hardware changes occur, the firmware configuration system frequently needs to generate new profile configurations to adapt to these changes.

In response to identifying a new profile configuration, the firmware configuration system adds the new profile configuration to the profile configuration table on the host device, as shown in the sub-act 334. For instance, the firmware configuration system writes or appends the new profile configuration to the profile configuration table in the flash memory of the host device. If a new profile configuration is not identified, the firmware configuration system can determine if the updated profile configuration table includes a modified profile configuration (e.g., go to the sub-act 336).

As shown, the act 314 includes a sub-act 336 of identifying a modified profile configuration. For example, when one or more profile configuration settings of a previous profile configuration need to change, the firmware configuration system generates or otherwise receives a modified profile configuration. For instance, when clients or entities desire a profile configuration change, the firmware configuration system generates a modified profile configuration to accommodate this change.

In response to identifying a modified profile configuration, the firmware configuration system updates the profile configuration table on the flash memory of the host device with the modified profile configuration, as shown in the sub-act 338. In some instances, the firmware configuration system updates the previous profile configuration by replacing it with the modified profile configuration from the profile capsule. In various instances, the firmware configuration software replaces the profile configuration table previously stored on the host device with the updated profile configuration table from the profile capsule.

While the sub-acts of the act 314 are shown in a particular flow arrangement, the firmware configuration system may follow a variety of flows. For example, the firmware configuration system performs the sub-acts of 330, 332, and 334. In another example, the firmware configuration system performs the sub-acts of 330, 336, and 338. Indeed, in some instances, the sub-acts of 332 and 336 can be mutually exclusive. In various implementations, the firmware configuration system merely performs the act 314 by replacing a previous profile configuration table with any received profile configuration table that is different.

Upon updating the profile configuration table on the flash memory of the host device, the firmware configuration system initializes the host device, as shown in the act 316 and as described previously. Accordingly, the firmware configuration system efficiently and flexibly facilitates adding a new BIOS profile configuration as well as updating an existing BIOS profile configuration. Indeed, the firmware configuration system facilitates performing multiple UEFI firmware profile configuration updates through surgical injection into the profile configuration table of the BIOS without needing to rebuild and flash the entire BIOS of a host device. Additionally, when utilizing an out-of-band communication path, the firmware configuration system performs these updates without disrupting the workflow of the CPU on the host device.

Figure 4:
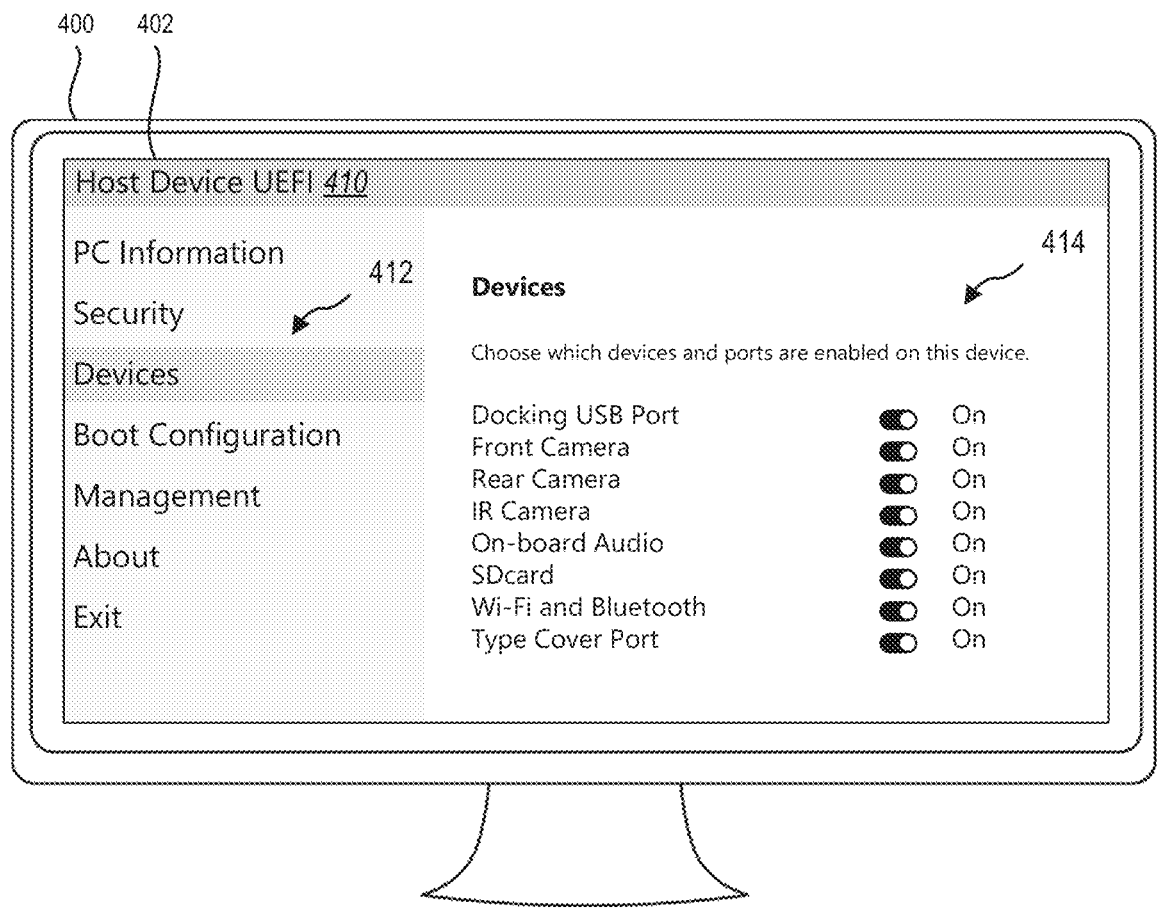
FIG. 4 illustrates an example graphical user interface based on a profile configuration in accordance with one or more implementations.

Turning now to FIG. 4, an example of a profile configuration is provided. In particular, FIG. 4 illustrates an example graphical user interface based on a profile configuration in accordance with one or more implementations. As shown, FIG. 4 includes a computing device 400 (e.g., a host device or server device) having a graphical user interface 402. Additionally, the graphical user interface 402 displays a host device UEFI 410 (i.e., a firmware profile) having menu options 412 and sub-menu options 414 based on the settings specified in a firmware profile configuration.

To illustrate, in various implementations, the host device UEFI 410 provides a graphical representation of options and settings available on the computing device 400. For example, the host device UEFI 410 corresponds to a UEFI profile that indicates which configuration options (e.g., menu options) and settings to display as well as their default settings. As shown, the profile configuration indicates displaying and enabling the "Docking USB Port." Other profile configuration settings are also shown. In some instances, the profile configuration indicates to not display a profile configuration setting. For example, a profile configuration includes a setting to disable an external memory card port (e.g., where the computing device includes an external memory card port) and/or not display an option to change this setting.

As described above, when a new or modified profile configuration is desired, the firmware configuration system on the computing device 400 quickly and easily facilitates updating the profile configuration table on the computing device 400 and initializing it for use. Indeed, a management entity may provide a signed firmware configuration profile capsule to the computing device 400 and the firmware configuration system (e.g., the BMC on the computing device) injects the received profile configurations to generate an updated profile configuration table in the flash memory (i.e., SPI flash) of the computing device 400.

Figure 5:
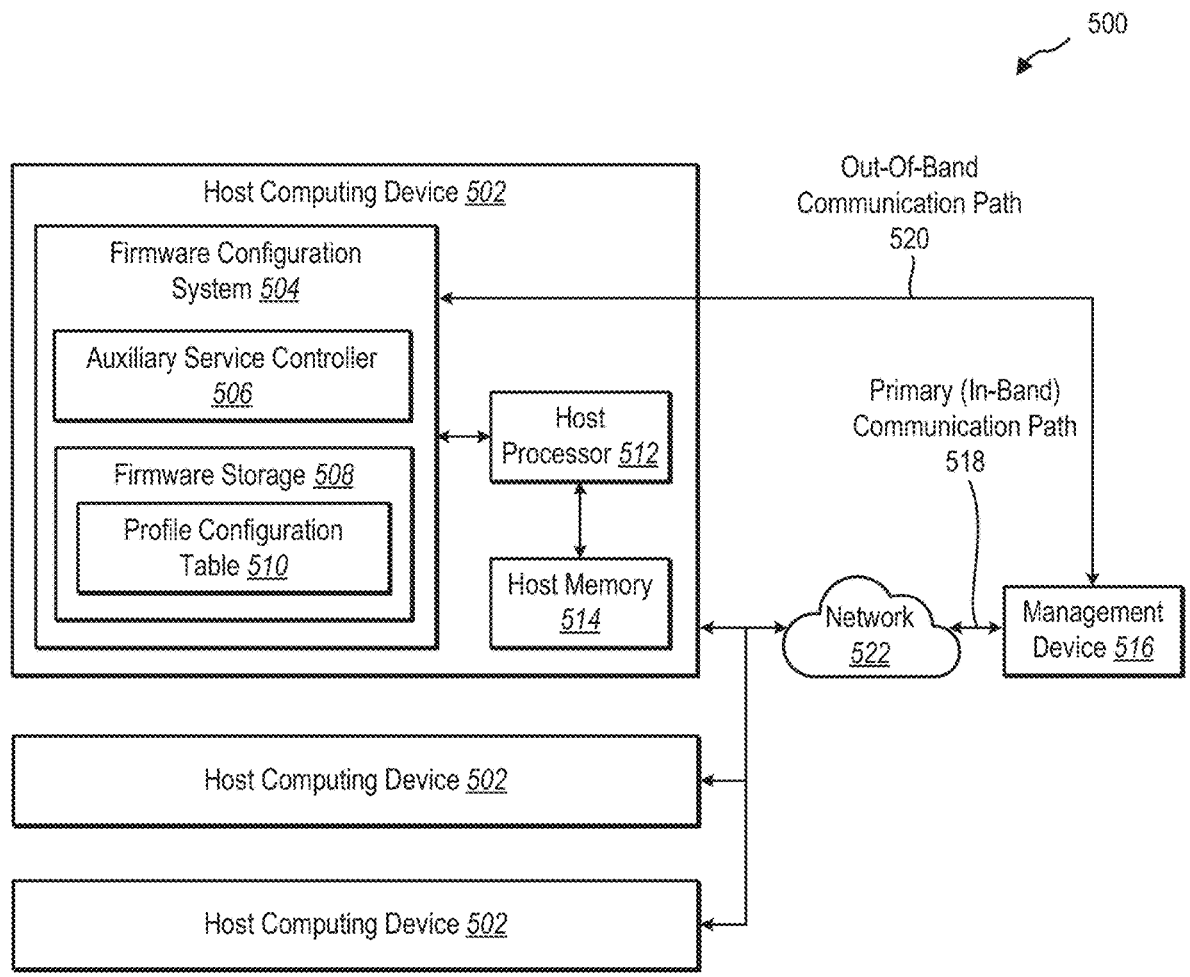
FIG. 5 illustrates a diagram of a computing system environment where a firmware configuration system is implemented in accordance with one or more implementations.
Figure 6:
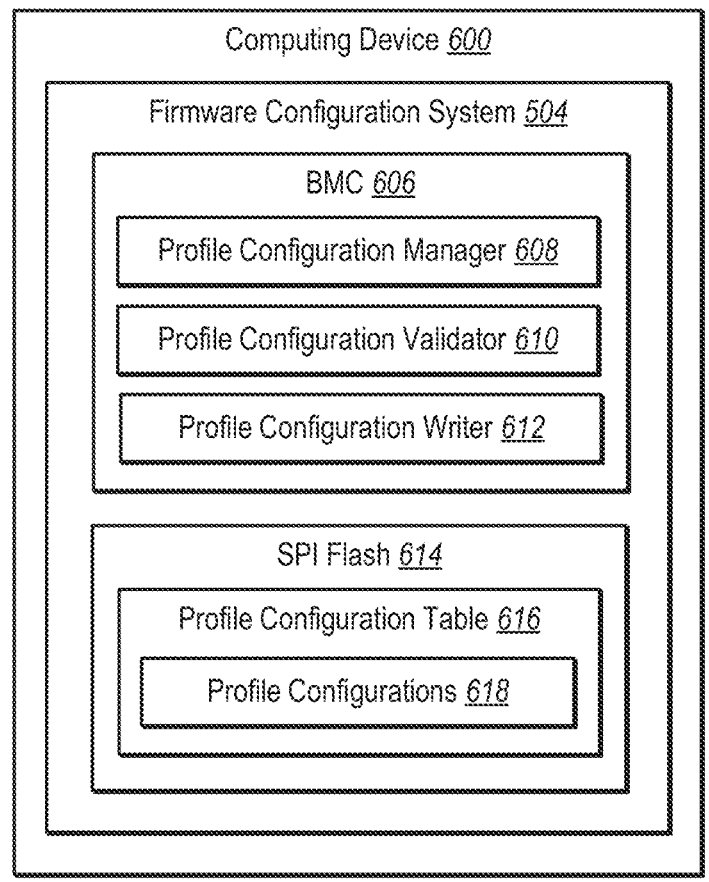
FIG. 6 illustrates a diagram of components of a firmware configuration system in accordance with one or more implementations.

Turning now to FIG. 5 and FIG. 6, additional detail is provided regarding the environment in which the firmware configuration system is implemented. In particular, FIG. 5 illustrates a diagram of an environment 500 where a firmware configuration system 504 is implemented in accordance with one or more implementations. As shown, the environment 500 (e.g., a digital system environment) includes multiple instances of host computing devices 502. In some implementations, the environment 500 includes a large number of host computing devices 502, such as a data center with hundreds or thousands of host computing devices 502.

In various implementations, the host computing devices 502 perform a variety of functions and/or execute different operations. However, in these implementations, the host computing devices 502 include at least components 504-514, which are described below. Additionally, in various implementations, the host computing devices 502 are physically located at the same location, such as at a regional datacenter. In alternative implementations, the host computing devices 502 are located in multiple physical locations, such as different datacenters.

As shown in the first instance of the host computing devices 502, the host computing devices 502 include the firmware configuration system 504 having an auxiliary service controller 506 and a firmware storage 508, a host processor 512, and host memory 514. The host processor 512 electronically communicates with the host memory 514 to perform operations of the host computing device. For example, the host processor 512 executes an operating system, applications, and other instructions maintained on the host memory 514. In various implementations, the host memory 514 maintains BIOS information. For instance, while illustrated differently, in some cases, the host memory 514 may include a profile configuration table having one or more UEFI profile configurations.

As shown, the environment 500 includes a management entity 516 that communicates with the host computing devices 502 via one or more computer networks, such as network 522. In various implementations, the management entity 516 performs various management operations with respect to the host computing devices 502. For example, the management entity 516 monitors and manages components, operations, and functions of the host computing devices 502. As another example, the management entity 516 pushes a firmware profile capsule having a firmware profile configuration update to one or more of the host computing devices 502.

As noted above, there are multiple reasons for a firmware profile configuration update to be installed on one or more of the host computing devices 502. One possible reason for installing a firmware profile configuration update on a host computing device is to add a new profile configuration.

Another possible reason for installing a firmware profile configuration update on a host computing device is to modify or fix the profile configuration settings of an existing profile configuration.

As an example of installing a firmware profile configuration update, the management entity 516 provides a firmware profile configuration update to one of the host computing devices 502 (e.g., via a firmware capsule). In some instances, the management entity 516 provides the firmware profile configuration update to a particular host computing device or set of host computing devices. As part of providing the firmware profile configuration update, the management entity 516 provides or triggers instructions that cause the host computing device to install the firmware profile configuration update.

To further illustrate, as shown, the host computing devices 502 include the firmware configuration system 504 having the auxiliary service controller 506 and the firmware storage 508 (e.g., non-volatile random-access memory such as SPI flash). As also shown, the firmware storage 508 maintains a profile configuration table 510, such as a profile configuration table of UEFI profile configurations. In one or more implementations, the firmware storage 508 includes additional information corresponding to the BIOS.

In various implementations, the auxiliary service controller 506 is a specialized microcontroller within the host computing devices 502, separate from the host processor 512. In some implementations, the auxiliary service controller 506 includes its own processor and its own memory (e.g., the storage 508). In various implementations, the auxiliary service controller 506 is a baseband management controller (BMC).

In one or more implementations, the firmware configuration system 504 receives a firmware profile configuration update from the management entity 516. In response, in many implementations, the firmware configuration system 504 utilizes the auxiliary service controller 506 to update the profile configuration table 510 on the host computing device based on an updated profile configuration table included in the firmware profile configuration update, as described above.

As shown, the environment 500 includes a primary communication path 518. In various implementations, the management entity 516 communicates with the host computing devices 502 via the primary communication path 518, such as through in-band communications with the host processor 512 of a host computing device via the network 522. In a few implementations, the management entity 516 sends firmware profile configuration updates to a host computing device via the primary communication path 518.

Additionally, the environment 500 includes an out-of-band communication path 520. In various implementations, the out-of-band communication path 520 facilitates communications between the management entity 516 with the firmware configuration system 504 (e.g., the auxiliary service controller 506 on the firmware configuration system 504) while bypassing communications with the host processor 512. Indeed, in many instances, the out-of-band communication path 520 is an independent mechanism or communication path through which the management entity 516 communicates with the firmware configuration system 504 of the host computing devices 502. According to some implementations, the out-of-band communication path 520 operates via one or more computer networks, such as the network 522 and/or another separate computer network. In some implementations, the out-of-band communication path 520 is a direct connection between the management entity 516 and a host computing device (i.e., one of the host computing devices 502).

As noted above, by utilizing the out-of-band communication path 520, the host computing devices 502 may receive and install firmware profile configuration updates without disrupting the workload and operations of the host processor 512. Indeed, because the firmware configuration system 504 operates separately from the host processor 512 in most implementations, the firmware configuration system 504 receives firmware profile configuration updates via the out-of-band communication path 520 and updates the profile configuration table 510 without interrupting operating system operations of the host computing device.

In some implementations, the auxiliary service controller 506 is configured as a PCI-e endpoint device that utilizes a PCI-e communication interface for various communications, such as communicating with the host processor 512 of a host computing device. In various implementations, the auxiliary service controller 506 via a Universal Serial Bus (USB) communication interface. In certain implementations, the auxiliary service controller 506 communicates with the host processor 512 via a low pin count (LPC) bus. According to some implementations, the auxiliary service controller 506 communicates with the host processor 512 via an Ethernet interface.

FIG. 6 provides additional details regarding the capabilities and components of the firmware configuration system 504. In particular, FIG. 6 illustrates a diagram of components of a firmware configuration system in accordance with one or more implementations.

As shown, a computing device 600 includes the firmware configuration system 504, which includes implementations and examples of the firmware configuration system previously mentioned. As also shown, the firmware configuration system 504 includes a BMC 606 and SPI flash 614. The BMC 606 (baseband management controller) includes a profile configuration manager 608, a profile configuration validator 610, and a profile configuration writer 612. The SPI flash 614 includes a profile configuration table 616 having profile configurations 618.

In various implementations, the BMC 606 is an example of the auxiliary service controller 506 described above. For example, the BMC 606 performs the actions of receiving a firmware profile configuration update from another computing device, such as a management entity, and injecting profile configurations from the updated firmware profile configuration update into the profile configuration table on the computing device 600. To elaborate, the BMC 606 utilizes the components shown to update the profile configurations in the UEFI BIOS firmware on the computing device 600.

For example, in various implementations, the profile configuration manager 608 receives, accesses, identifies, modifies, stores, or otherwise manages firmware profile configuration updates. According to some implementations, the profile configuration manager 608 receives a firmware profile configuration update capsule via an out-of-band communication path separate from primary communications to the computing device 600.

In various implementations, the profile configuration validator 610 ensures that firmware profile configuration updates are received properly and/or are from authorized sources. For example, in some implementations, the profile configuration validator 610 performs CRC checks on a received firmware profile configuration update capsule to ensure that data in the capsule is accurate. Additionally, according to some implementations, the profile configuration validator 610 performs encryption validation on the update to ensure that an authorized agent sent the update, as described above.

In one or more implementations, the profile configuration writer 612 writes or injects profile configuration data into the profile configuration table 616 of the SPI flash 614. For example, the profile configuration writer 612 writes one or more profile configurations from an updated profile configuration table in a received firmware update to the profile configurations 618 of the profile configuration table 616 in the SPI flash 614, which generates an updated profile configuration table in the SPI flash 614 of the computing device 600, as described above. In some instances, the profile configuration writer 612 replaces the profile configuration table 616 with an updated profile configuration table received in the update (i.e., a firmware profile capsule).

Figure 7:
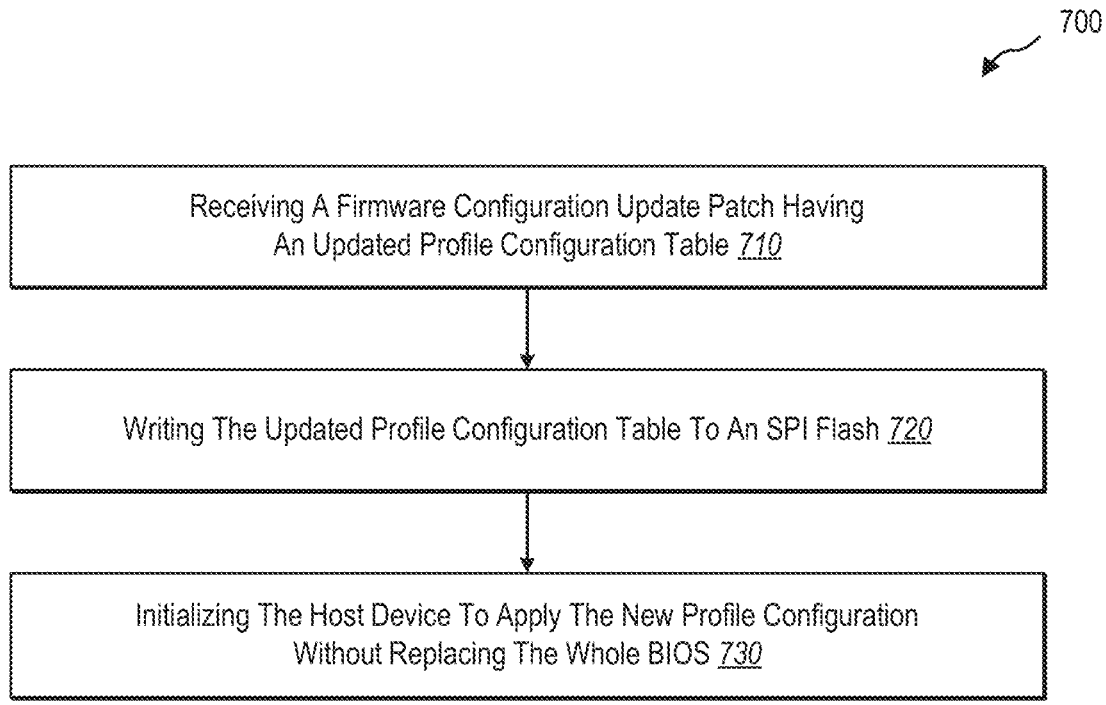
FIG. 7 illustrates an example series of actions for updating a firmware profile configuration in accordance with one or more implementations.

Turning now to FIG. 7, this figure illustrates an example flowchart that includes a series of acts 700 for utilizing the firmware configuration system in accordance with one or more implementations. In particular, FIG. 7 illustrates an example series of acts 700 for updating a firmware profile configuration in accordance with one or more implementations. Furthermore, the acts of FIG. 7 can be performed as part of a method. Alternatively, a non-transitory computer-readable medium can include instructions that, when executed by one or more processors, cause a computing device to perform the acts 700 of FIG. 7. In still further implementations, a system can perform the acts 700 of FIG. 7. In some implementations, a processing engine performs one or more of the acts of the series of acts 700. In various implementations, a baseboard management controller (BMC) of a server device (i.e., a computing device) performs the series of acts 700.

As shown, the series of acts 700 includes an act 710 of receiving a firmware configuration update patch having an updated profile configuration table. For instance, in example implementations, the act 710 involves receiving, by a computing device, a firmware configuration update patch including a firmware profile capsule that includes a profile configuration table, where. In some implementations, the profile configuration table includes a new profile configuration. In various implementations, the act 710 includes receiving a firmware configuration update patch, including a firmware profile capsule that includes a new profile configuration. According to some implementations, the act 710 includes receiving a firmware configuration update patch including a firmware profile capsule that includes a modified profile configuration table having a modified profile configuration. In example implementations, the act 710 is performed by a server device and/or a host computing device.

In many implementations, the act 710 includes receiving the firmware profile capsule via an out-of-band communication path. In one or more implementations, the new profile configuration in the profile configuration table is not included in the previous profile configuration table. In some implementations, the new profile configuration in the profile configuration table modifies a previous profile configuration included in the previous profile configuration table. In some instances, the firmware profile capsule includes a unified extensible firmware interface profile (UEFI profile) corresponding to a basic input/output system (BIOS) of the computing device. In additional implementations, the UEFI profile includes the profile configuration table.

In one or more implementations, the firmware profile capsule includes a profile configuration table having the new profile configuration. In some implementations, the firmware profile capsule includes a firmware profile header, the new profile configuration, and security verification information. In various implementations, the firmware profile header includes an encryption signature, firmware profile information, and SPI flash offset information. In various implementations, the new profile configuration includes configuration settings indicating activation states of hardware elements of the computing device.

As further shown, the series of acts 700 includes an act 720 of writing the updated profile configuration table to an SPI flash. For instance, in example implementations, the act 720 involves writing the profile configuration table to a serial peripheral interface flash (SPI flash) to modify a previous profile configuration table including previous profile configurations. In various implementations, the act 720 includes writing the new profile configuration to a previous profile configuration table stored in an SPI flash to generate an updated profile configuration table. In some implementations, the act 720 includes replacing a previous profile configuration on an SPI flash of the server device with the modified profile configuration.

In various implementations, the act 720 includes modifying the previous profile configuration table by adding or replacing one or more profile configurations to the previous profile configuration table to store a new profile configuration table in the SPI flash. In some instances, modifying the previous profile configuration table in the act 720 includes writing the profile configuration table in a single predetermined location in the SPI flash.

In some implementations, the act 720 includes writing the profile configuration table to the SPI flash by injecting the profile configuration table into the SPI flash without interrupting operating system operations of the computing device. In one or more implementations, the act 720 includes writing the profile configuration table to the SPI flash by updating the previous profile configuration table without modifying the binary code of a basic input/output system (BIOS) of the computing device. In many implementations, the firmware configuration update patch is not a firmware runtime patch applied to a runtime code area of the BIOS.

As further shown, the series of acts 700 includes an act 730 of initializing the host device to apply the new profile configuration without replacing the whole BIOS. For instance, in example implementations, the act 730 involves initializing the computing device to apply the new profile configuration. In one or more implementations, the act 730 includes initializing the server device to apply the new profile configuration in the updated profile configuration table. In various implementations, the act 730 includes rebooting the server device to apply the modified profile configuration on the server device. In some implementations, the act 730 of replacing the previous profile configuration includes replacing a previous profile configuration table in the SPI flash with the modified profile configuration table.

In several implementations, the act 730 includes initializing the computing device by rebooting the computing device to apply the new profile configuration from the SPI flash. In various implementations, the act 730 includes a baseboard management controller updating a unified extensible firmware interface (UEFI) of a server device utilizing the firmware profile capsule without flashing the basic input/output system (BIOS) of the server device. As noted above, in many implementations, the firmware profile capsule is received by the baseboard management controller as an out-of-band communication.

In some implementations, the series of acts 700 includes additional acts. For example, in certain implementations, the series of acts 700 includes an act of authenticating the firmware profile capsule based on one or more security measures. In additional implementations, the one or more security measures include public/private key encryption operations.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry the needed program code means in the form of computer-executable instructions or data structures and which can be accessed by a general-purpose or special-purpose computer. Combinations of the above should also be included within the scope of computer-readable media.

In addition, the network (i.e., computer network) described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may communicate. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 8:
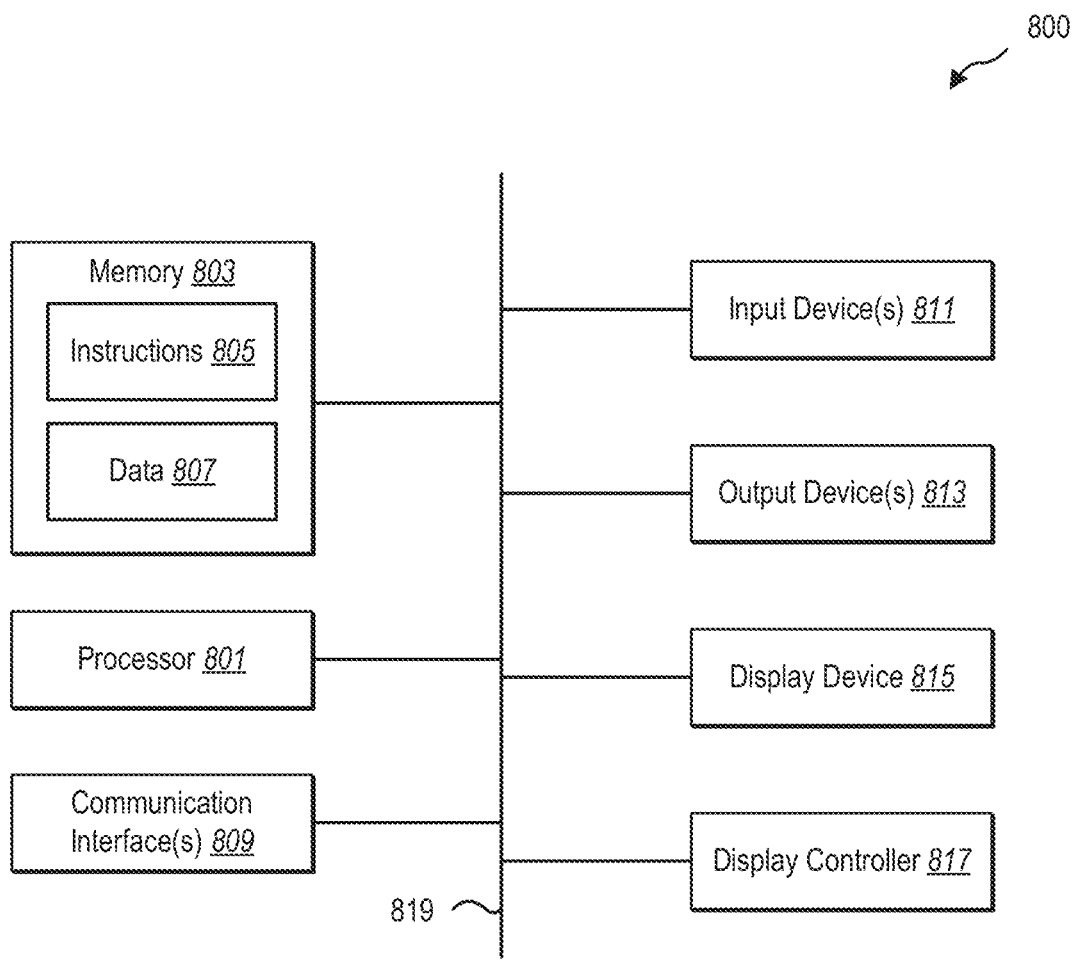
FIG. 8 illustrates example components included within a computer system.

FIG. 8 illustrates certain components that may be included within a computer system 800. The computer system 800 may be used to implement the various computing devices, components, and systems described herein.

In various implementations, the computer system 800 may represent one or more of the client devices, server devices, or other computing devices described above. For example, the computer system 800 may refer to various types of network devices capable of accessing data on a network (i.e., a computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 800 includes a processor 801 (e.g., a host processor). The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although the processor 801 shown is just a single processor in the computer system 800 of FIG. 8, in an alternative configuration, a combination of processors (e.g., an ARM and DSP) could be used.

The computer system 800 also includes memory 803 (e.g., host memory) in electronic communication with the processor 801. The memory 803 may be any electronic component capable of storing electronic information. For example, the memory 803 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 805 and the data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during the execution of the instructions 805 by the processor 801.

A computer system 800 may also include one or more communication interface(s) 809 for communicating with other electronic devices. The one or more communication interface(s) 809 may be based on wired communication technology, wireless communication technology, or both. Some examples of the one or more communication interface(s) 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input device(s) 811 and one or more output device(s) 813. Some examples of the one or more input device(s) 811 include a keyboard, mouse, microphone, remote control device, button, joystick, trackball, touchpad, and light pen. Some examples of the one or more output device(s) 813 include a speaker and a printer. A specific type of output device that is typically included in a computer system 800 is a display device 815. The display device 815 used with implementations disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network (i.e., computer network), both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is therefore indicated by the appended claims rather than by the foregoing description. Changes that come within the meaning and range of equivalency of the claims are to be embraced within their scope.

What is claimed is:

1. A computer-implemented method comprising:
   receiving, by a computing device, a firmware configuration update patch for updating firmware on the computing device, the firmware configuration update patch comprising a firmware profile capsule that includes a profile configuration table and a profile header, wherein the profile configuration table comprises a new profile configuration not included in a previous profile configuration table, and wherein the profile header includes offset information indicating a single non-scattered location on a serial peripheral interface (SPI) flash where the profile configuration table is to be written;
   writing, to the single non-scattered location on the SPI flash, the profile configuration table to the location on the SPI flash indicated by the profile header to modify the previous profile configuration table comprising previous profile configurations; and
   initializing the computing device to apply the new profile configuration.

2. The computer-implemented method of claim 1, wherein the profile configuration table includes both the new profile configuration and at least one profile configuration included in the previous profile configuration table.

3. The computer-implemented method of claim 1, wherein the new profile configuration in the profile configuration table modifies a previous profile configuration included in the previous profile configuration table.

4. The computer-implemented method of claim 1, wherein:
the firmware profile capsule comprises the profile header, the new profile configuration, and security verification information; and
the profile header comprises an encryption signature, firmware profile information, and the offset information indicating the single non-scattered location on the SPI flash where the profile configuration table is to be written.

5. The computer-implemented method of claim 1, wherein the new profile configuration comprises configuration settings indicating activation states of hardware elements of the computing device.

6. The computer-implemented method of claim 1, further comprising authenticating the firmware profile capsule based on one or more security measures.

7. The computer-implemented method of claim 1, wherein modifying the previous profile configuration table comprising adding or replacing one or more profile configurations to the previous profile configuration table to store a new profile configuration table in the SPI flash.

8. The computer-implemented method of claim 1, wherein modifying the previous profile configuration table comprising writing the profile configuration table in a single predetermined and non-scattered location in the SPI flash.

9. The computer-implemented method of claim 1, wherein:
receiving the firmware profile capsule comprises receiving the firmware profile capsule via an out-of-band communication path; and
writing the profile configuration table to the SPI flash comprises injecting the profile configuration table into the SPI flash without interrupting operating system operations of the computing device.

10. The computer-implemented method of claim 1, wherein writing the profile configuration table to the SPI flash comprises updating the previous profile configuration table without modifying binary code of a basic input/output system (BIOS) of the computing device.

11. The computer-implemented method of claim 10, wherein the firmware configuration update patch is not a firmware runtime patch applied to a runtime code area of the BIOS.

12. The computer-implemented method of claim 1, wherein initializing the computing device comprises rebooting the computing device to apply the new profile configuration from the SPI flash.

13. The computer-implemented method of claim 1, wherein the offset information indicates a starting location and an ending location of the single non-scattered location on the SPI flash where the profile configuration table is to be written.

14. A system comprising:
a baseboard management controller on a computing device having at least one processor; and
a non-transitory computer memory comprising instructions that, when executed by the at least one processor, cause the baseboard management controller to:
receive a firmware configuration update patch for updating firmware on the computing device, the firmware configuration update patch comprising a firmware profile capsule that includes a profile configuration table and a profile header, wherein the profile configuration table comprises a new profile configuration not included in a previous profile configuration table, and wherein the profile header includes offset information indicating a single non-scattered location on a serial peripheral interface (SPI) flash where the profile configuration table is to be written;
write, to the single non-scattered location on the SPI flash, the new profile configuration to the location on the SPI flash indicated by the profile header to modify the previous profile configuration table comprising previous profile configurations; and
initialize the computing device to apply the new profile configuration.

15. The system of claim 14, wherein the firmware profile capsule comprises the profile configuration table having both the new profile configuration and at least one profile configuration included in the previous profile configuration table.

16. The system of claim 14, further comprising instructions that, when executed by the at least one processor, cause the baseboard management controller to update a unified extensible firmware interface (UEFI) of the server device utilizing the firmware profile capsule without flashing a basic input/output system (BIOS) of the server device.

17. The system of claim 14, wherein the firmware profile capsule is received by the baseboard management controller as an out-of-band communication.

18. A computer-implemented method comprising:
receiving, by a baseboard management controller of a server device, a firmware configuration update patch for updating firmware on the server device, the firmware configuration update patch comprising a firmware profile capsule that includes a profile configuration table and a profile header, wherein the profile configuration table includes offset information indicating a single non-scattered location on a serial peripheral interface (SPI) flash where the profile configuration table is to be written;
writing, to the single non-scattered location on the SPI flash by the baseboard management controller, the profile configuration table to the location on the SPI flash indicated by the profile header to modify the previous profile configuration table comprising previous profile configurations; and
initializing the server device to apply the new profile configuration.

19. The computer-implemented method of claim 18, wherein writing the profile configuration table to the single non-scattered location on the SPI flash comprises replacing a previous profile configuration table in the SPI flash with the new profile configuration table.

20. The computer-implemented method of claim 19, wherein writing the profile configuration table to the single non-scattered location on the SPI flash comprises writing the profile configuration table in the SPI flash without modifying binary code of a basic input/output system (BIOS) of the server device.

* * * * *